No. 807,185. PATENTED DEC. 12, 1905.
W. L. MORRIS.
WAD SORTING MACHINE.
APPLICATION FILED MAR. 8, 1901.
5 SHEETS—SHEET 1.
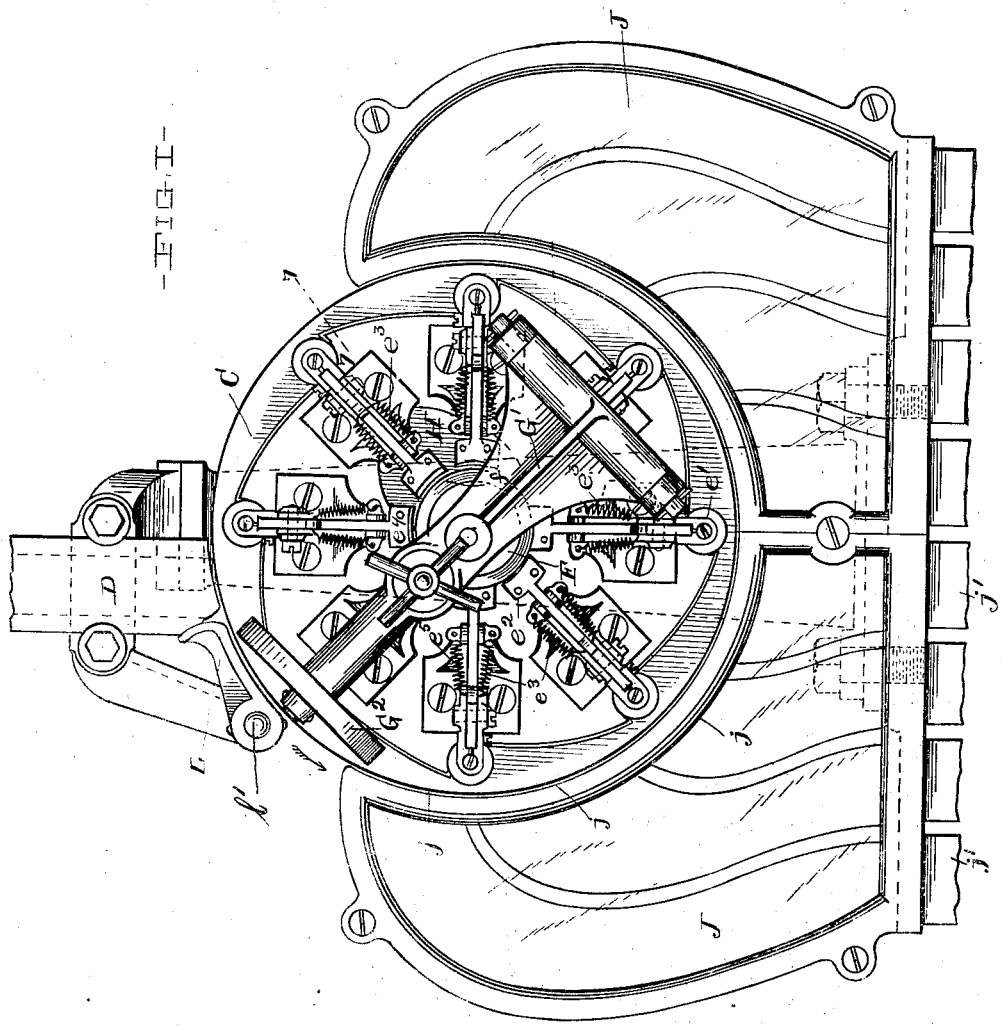
Witnesses,
J. C. Turner
N. E. Merkel
Inventor,
Wm L. Morris
By J. D. Fay
Atty.

No. 807,185. PATENTED DEC. 12, 1905.
W. L. MORRIS.
WAD SORTING MACHINE.
APPLICATION FILED MAR. 8, 1901.
5 SHEETS—SHEET 2.
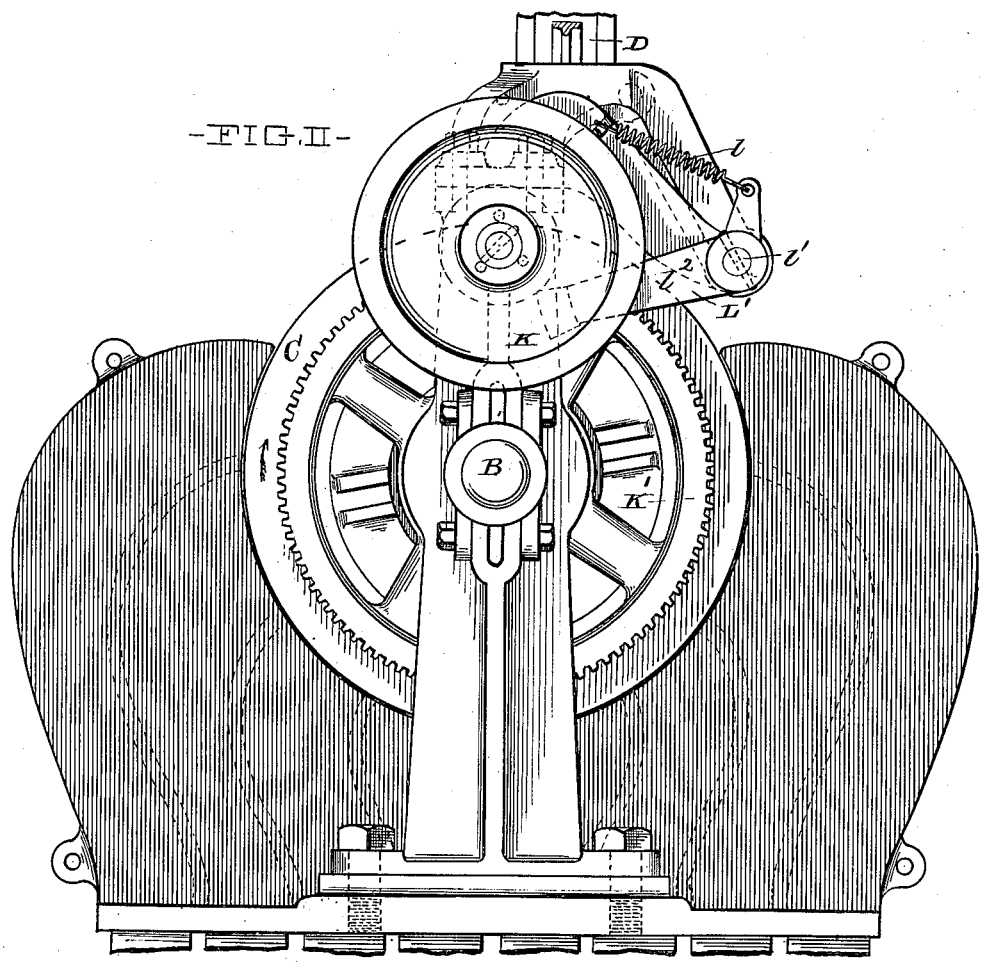
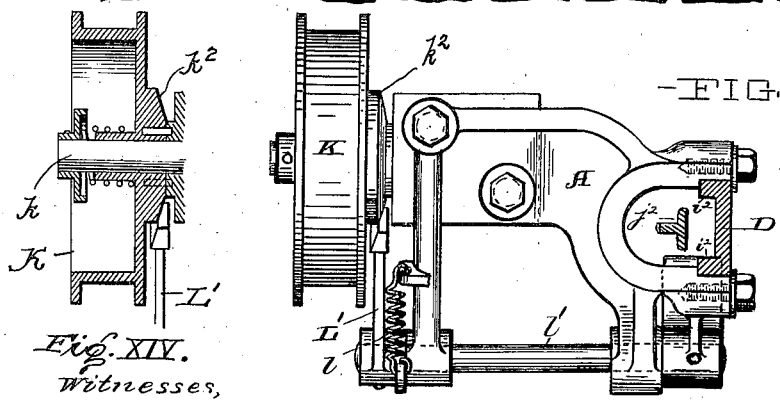

No. 807,185. PATENTED DEC. 12, 1905.
W. L. MORRIS.
WAD SORTING MACHINE.
APPLICATION FILED MAR. 8, 1901.
5 SHEETS—SHEET 3.
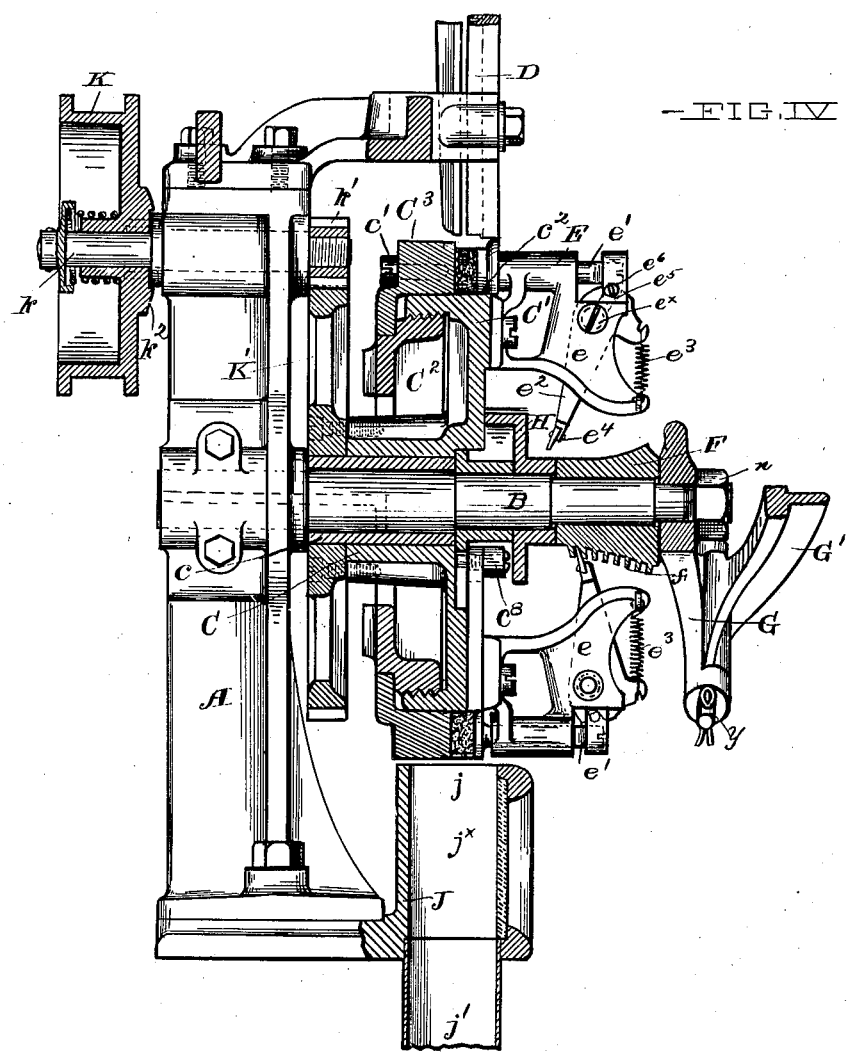
FIG. IV.
Witnesses,
J. C. Turner
N. E. Merkel.
Inventor
Wm L. Morris
By
J. D. Fay
Atty No. 807,185. PATENTED DEC. 12, 1905.
W. L. MORRIS.
WAD SORTING MACHINE.
APPLICATION FILED MAR. 8, 1901.
5 SHEETS—SHEET 4.
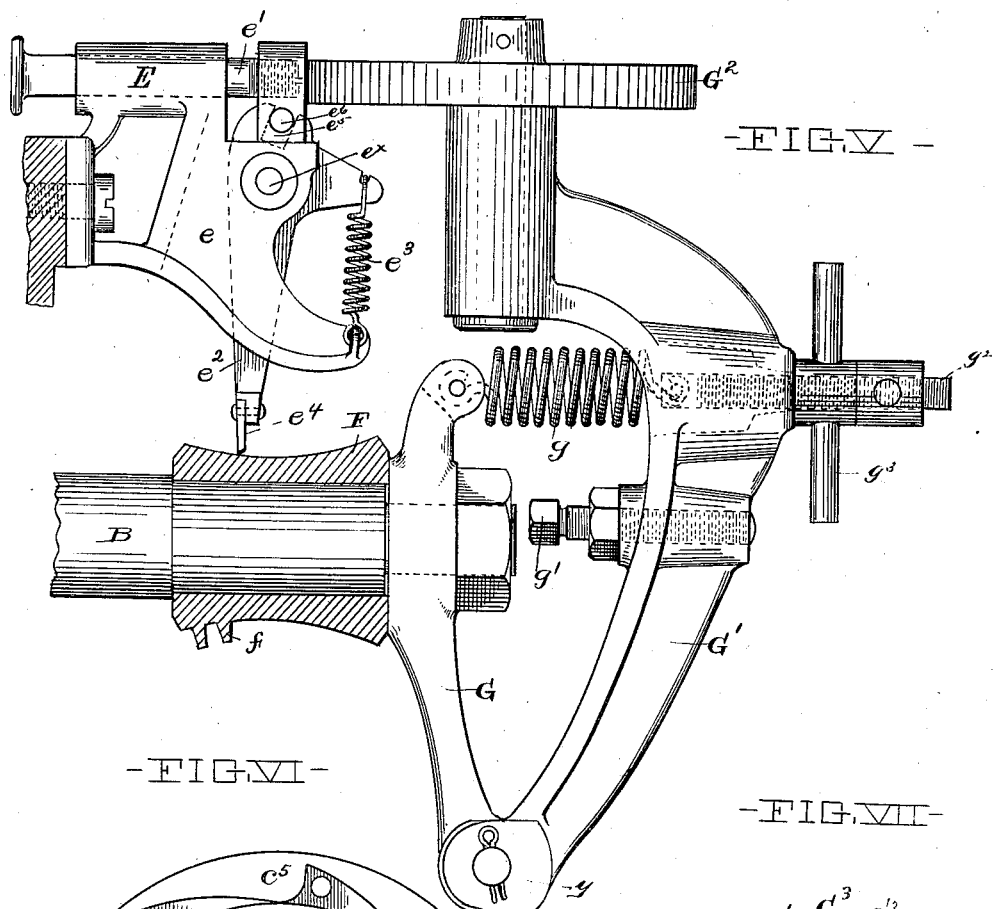
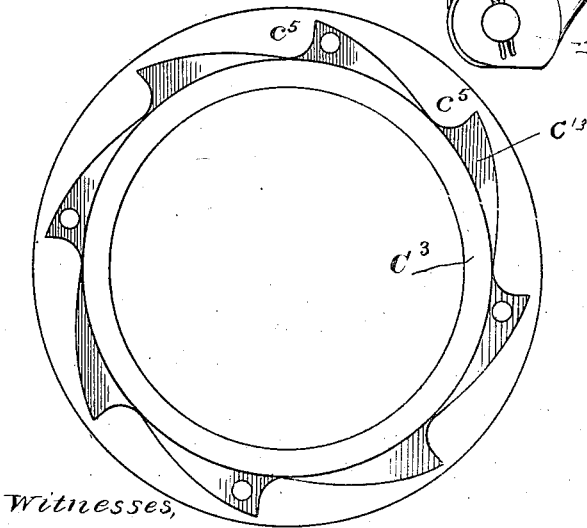
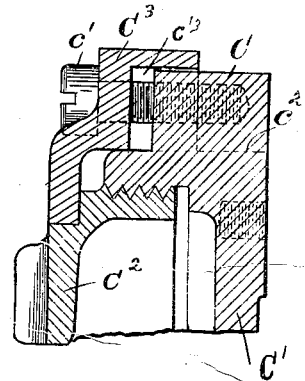
Witnesses
Inventor,
Wm L. Morris No. 807,185. PATENTED DEC. 12, 1905.
W. L. MORRIS.
WAD SORTING MACHINE.
APPLICATION FILED MAR. 8, 1901.
5 SHEETS—SHEET 5.
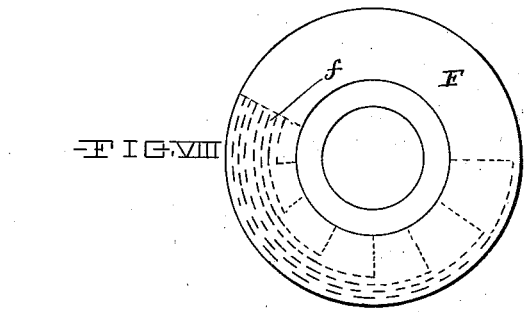
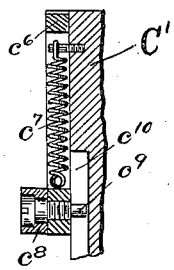
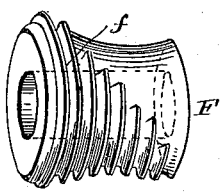
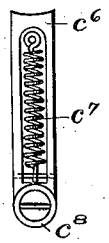
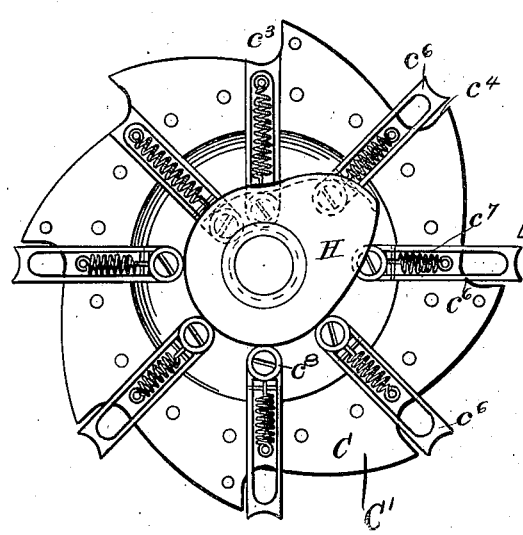
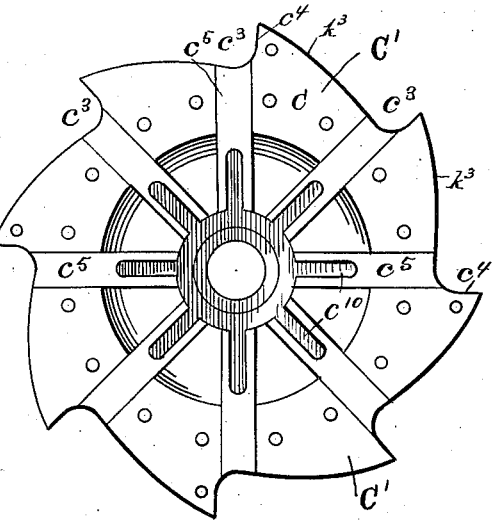
Witnesses,
J. C. Turner
N. E. Merkel
Inventor,
By Wm. L. Morris
J. D. Fay
Atty.

UNITED STATES PATENT OFFICE.

WILLIAM L. MORRIS, OF CLEVELAND, OHIO, ASSIGNOR TO THE AUSTIN CARTRIDGE COMPANY, OF CLEVELAND, OHIO, A CORPORATION OF OHIO.

WAD-SORTING MACHINE.

No. 807,185.      Specification of Letters Patent.      Patented Dec. 12, 1905.

Application filed March 8, 1901. Serial No. 50,342.

*To all whom it may concern:*

Be it known that I, WILLIAM L. MORRIS, a citizen of the United States, and a resident of Cleveland, county of Cuyahoga, and State of Ohio, have invented a new and useful Improvement in Wad-Sorting Devices, of which the following is a specification, the principle of the invention being herein explained and the best mode in which I have contemplated applying that principle, so as to distinguish it from other inventions.

My invention relates to devices for sorting wads used for loading shells in the manufacture of cartridges, its object being to automatically separate and sort such wads according to their respective thicknesses.

Said invention consists of means hereinafter fully described, and specifically pointed out in the claims.

The annexed drawings and following description set forth in detail certain means for carrying out said invention. Such disclosed means, however, constitute but one of the various mechanical forms in which the principle of the invention may be used.

In said annexed drawings, Figure I represents a front elevation of a wad-sorting machine embodying my invention. Fig. II represents a rear elevation of same. Fig. III represents a detail top plan view of a portion of said machine, showing the clutching mechanism for causing the operation of the machine to cease. Fig. IV represents a vertical axial transverse sectional view showing the supporting-frame spindle and other portions in elevation therein. Fig. V represents an elevational detail view, on an enlarged scale, showing the controlling-hub in section thereon. Fig. VI represents a detail view of a detached part, showing a portion of one of the parts of the wad-carrier and a wad-ejector plunger connected thereto. Fig. VII represents a detail section, on an enlarged scale, taken upon line 7 7, Fig. I. Fig. VIII represents a diagrammatic view illustrating the construction of the controlling-hub. Fig. IX represents a detail section of one of the wad-ejector plungers and contiguous parts; Fig. X, a detail perspective view of the controlling-hub, and Fig. XI a view in elevation of one of the wad-ejector plungers detached from the wad-carrier. Fig. XII represents a detail front elevation of a part of the wad-carrier, showing the wad-ejector and means for operating the latter; and Fig. XIII, a similar elevation showing a part of the wad-carrier with the wad-ejector and the means for operating the latter removed from such detached part. Fig. XIV is a detail sectional view showing one form of clutch mechanism which may be used.

Fixed to and projecting horizontally from a frame A is a supporting dead-spindle B, upon which the main portion of my improved wad-sorting device is mounted. Upon the inner end of said spindle is mounted a rotatable wad-carrier C, provided with a suitable bushing $c$, as shown in Fig. IV. Said wad-carrier comprises three parts C', $C^2$, and $C^3$, $C^2$ being in the form of a dished annulus having its periphery threaded externally and engaging an internal thread formed upon the part C', as shown in Figs. IV and VII. Upon the rear of the part $C^2$ is mounted, as shown in said figures, the part $C^3$, which is secured to the part C' by means of suitable screws $c'$. Upon the periphery of the part C', which extends outwardly from face of the part $C^3$, forming a projecting shoulder $c^2$, are formed a series of inclined depressions forming wad-openings $c^3$, Figs. XII and XIII, these depressions being bounded on the one side (the right, as illustrated) by an abrupt shoulder $c^4$. The part $C^3$ is provided with a series of depressions or recesses $c^{13}$, formed within an annular rim $c^5$, said depressions opposing and receiving the periphery of the part C' and having a contour corresponding with that of the periphery of the part C'. The opposing faces of the parts C' and $C^3$ are so located that the part C' fits into and is longitudinally slidable in the depressions $c^{13}$, Fig. VI, so that by loosening up the screws $c'$ and turning the part $C^2$ the width of the projecting and indented shoulder $c^2$ may be varied. These depressions and the side face of the part C' form a series of wad-recesses. Located above the disk C is a wad-feeding device D, which may be of any desired construction, having its discharge-opening so located and its construction and arrangement such as to permit of wads being successively discharged into the wad-recesses during the rotation of the wad-carrier. The wad-feeding device D (best shown in section in Fig. III) comprises a chute or raceway D, having edge flanges $i^2$, and a separate keeper-strip $j^2$, located at such distance from the raceway D as to permit wads of the required thickness to feed down the raceway by gravity. The wad-recess in the part C' each have an inclined portion $k^3$, as shown in Fig. XIII, so that a wad may be fed at any point upon the periphery of said carrier and such wad pass by the action of gravity down such inclined portion and finally be caused to come to rest against the abrupt shoulder $c^4$ when the carrier is rotated in the direction of the arrow, Fig. I.

Upon the outside of the carrier portion C' are secured a series of pressure devices E, each of which includes a frame $e$, depending from the portion E and having a lever $e^2$, pivoted at $e^\times$ to said frame, the upper end of said lever having a recess $e^5$ designed to engage a screw or projection $e^6$ upon the plunger $e'$, and a spring $e^3$, connected at one end to the frame $e$ and at its other end to a projection on the lever $e^2$, serves to move the plunger in one direction, as shown in Fig. IV.

Upon the outer end of the spindle B is fixedly secured by means of a nut $n$ a controlling-hub F, having formed upon its outer surface a series of elongated rib-like lugs $f$, Fig. X, of successively-increasing length. These lugs are located so as to fall within the oscillatory path of the lower ends of the levers $e^2$ when any one of the latter is in the same plane therewith passing through the spindle-axis, so that such latter ends may be oscillated during the rotation of the wad-carrier so as to enter between two adjacent lugs and engage the surface of the innermost of such two lugs. Such lower ends of said levers are provided with hard-steel contact-pieces $e^4$ for receiving the friction resulting from such engagement with said lugs. The normal position of such levers during which, as has been before mentioned, the plungers are in their withdrawn positions is such as to cause the lugs $f$ to fall without the rotary paths of said levers, the upper lever in Fig. IV being illustrated as occupying such position.

Secured by means of the nut $n$ to the outer extremity of the spindle B is a frame G, occupying an inclined position, as shown in Fig. I. To the lower end of such frame is hinged at $y$ the lower end of a pressure-lever G', Fig. V, upon the upper end of which is journaled a pressure-roller $G^2$. Said roller is held normally in the path of the outer extremities of the plungers $e'$ by a spring $g$, one end of which is secured to the frame G and the other end of which is adjustably secured to the lever G', as shown. The latter is provided with a set-screw $g'$, adapted to engage a stationary portion of the machine, such portion being conveniently the end of the spindle B, limiting the inward action of the spring $g$, and hence the inward movement of the roller $G^2$. It is thus seen from the above-described construction that the plungers $e'$ will be caused to successively project toward the wad-recesses in the wad-carrier. The length of these plungers is such as to cause such projection toward the wad-recesses to result in the pressure of the inner end of the plunger upon a wad seated in such recess, whereby such wad may become compressed and retained therein.

The location of the roller $G^2$ is such as to effect the inward movement of the plungers prior to the time at which the corresponding lever $e^2$ enters the axial plane of the ends of the lugs $f$. These lugs $f$, as illustrated in the diagrammatic view Fig. VIII, all begin in the same axial plane, such plane being located so as to intersect the rotary path of a fixed point in the wad-carrier beyond the point of intersection of such path by the axial plane of operation of the roller $G^2$.

Upon the outer face of the portion C' of the carrier is provided a series of grooves $c^{15}$, such grooves being equal in number to the number of the wad-recesses, their upper extremities intersecting the outer lower portions of such recesses near the abrupt shoulder $c^4$, as shown on Fig. XIII. Located and slidable in each such recess is an ejector-plunger $c^6$, its upper end being provided with an indented surface corresponding in contour with that of the lower portion of the wad-recess. These plungers are each provided with a helical spring $c^7$, one end of which is secured to the plunger and the other to the portion C' in a manner such that the action of such springs will cause or tend to cause these plungers to project radially outward into the wad-recesses. The inner ends of the plungers are provided with antifriction-rollers $c^8$. The outward movement of the ejectors is limited by means of a pin $c^9$, secured to the inner surface of each, said pin traveling in a groove $c^{10}$, formed in the part C'. Located in the rotary path of said rollers $c^8$ is a cam H, fixed to the spindle B by pressure exerted by the nut $n$, as shown in Figs. IV and XII. This cam is so located as to engage these rollers at a point in the rotary path of the carrier in advance of the point of wad-feed, so as to withdraw the plungers from the recesses prior to reaching such point of feed. The length of the cam is such as to release these rollers, and in consequence the plungers, at a point following the point of feed and also following the point of inward projection of the plungers $e'$ by the pressure-roller $G^2$, such release being caused to follow such projecting movement as nearly as is feasible. The location of such plungers $e^6$ is such as to cause the outer ends of each of them to be engaged and held by the action of its corresponding spring against a wad seated and held under pressure in the corresponding wad-recess by the corresponding plunger $e'$.

Arranged contiguously to the periphery of the wad-carrier are a series of wad-conducting channels J, (see Figs. I, II, and IV,) these channels being equal in number to the number of wad-recesses. The said channels J are preferably formed by castings provided with projections $j^x$, (see Fig. IV,) and when said castings are secured together, as shown in Fig. I, the projections constitute partitions or separating-walls. The receiving-openings $j$ of said channel J are contiguous to the periphery and occupy positions in the rotary path of the wad-carrier corresponding to the positions occupied by the ends of the lugs $f$, which do not fall in the same axial plane—that is, an axial plane passing through that extremity of each lug $f$ farthest ahead with reference to the direction of rotation of the carrier will pass through about the middle of such receiving-opening. The discharge or lower openings $j'$ of such channels communicate with suitable receptacles (not shown) for the reception of wads. These channels J are in the form of curved tubes which extend from the wad-recess $c^3$ in a curved line to a suitable position above a series of receptacles to receive the wads, there being a channel J for each wad-recess $c^3$.

A driving-pulley K, Fig. IV, is mounted upon a driving-shaft $k$, upon the inner end of which is secured a pinion $k'$, meshing with a driving-gear K', secured to the rotary carrier in a suitable manner, whereby such carrier may be continuously rotated.

The operation of the device is as follows: The carrier C is rotated by driving the pulley K continuously, and wads are fed through the wad-feeding means D to the periphery of such carrier, whereby each wad-recess is caused to receive and hold a wad. Such wads are carried along in the recesses and rest freely therein until they come within the plane of action of the pressure-roller $G^2$, whereupon the corresponding plunger $e'$ is actuated inwardly and presses upon such wad with a pressure determined by the tension of the spring $g$. Such pressure may be adjusted so as to be substantially equal to that which is exerted upon the wad when subsequently inserted in a cartridge. The tension of the spring $g$ may be regulated to give the required adjustment of the plungers $e'$ by means of a threaded rod $g^2$, to one end of which the spring $g$ is secured, a hand-nut $g^3$ serving to give the required tension to said spring, as shown in Fig. V. The result of such action of the pressure-roller is to oscillate the lower end of the lever $e^2$ in an outward direction and into the sphere of action of the lugs $f$. In the event that the wads are of different thicknesses it is seen that the positions of said lever ends indicate the wad thickness. Such different thicknesses of wads causing the lever ends to assume correspondingly-different positions bring such ends into engagement with different lugs $f$ upon the continued rotation of the wad-carrier, so that it is seen that the wad thickness determines which lug shall engage the corresponding lever. Such engagement, however, always begins to take place at the same point in the rotary path of the carrier as a result of the position of the ends of the lugs aforementioned. The contact-pieces $e^4$ are beveled at their outer ends, and the lugs $f$ are also beveled. Hence there is no liability of the contact-pieces coming in contact with the ends of the lugs. Immediately after such thickness has been determined by the pressure-roller and plunger and the subsequent engagement of the corresponding lever with the corresponding lug $f$ the cam H releases the corresponding ejector-plunger, which is then held in position by the wad, which in turn is held so as to maintain such position of the ejector-plunger by the corresponding plunger $e'$. At a point in the subsequent rotation of the carrier, depending upon the length of the lug $f$, which is engaging the lever $e^2$, the latter is released, such release taking place at a point corresponding with the position of the receiving-opening of one of the wad-channels and is immediately followed by the operation of the corresponding ejector-plunger, which ejects the wad into such channel. In this manner wads of substantially the same thickness while under pressure are ejected into the same channel and are hence conducted into the same receptacle, the ejecting means being controlled by the means for securing the wads in the carrier, such securing means being controlled by the wad thickness through the medium of the thickness-determining means.

The advantage of sorting wads in the manner above described, wherein the sorting is dependent upon the thickness of the wad while under pressure, is apparent to those who are skilled in the art of manufacturing cartridges wherein such wads are used, especially when the wad matter is, as is usually the case, felt or similar easily-compressible matter.

In order to cause the operation of the machine to cease upon the faulty operation of the feeding means, I provide a lever L, Figs. I and III, whose free end is curved, as shown, and lies at a point contiguous to the path of movement of the wads while seated normally in the carrier. Such position is maintained by spring $l$, Fig. II, suitably connected with a shaft $l'$, upon the end of which said lever is secured. Upon the inner end of said shaft, Fig. II, is secured a lever $l^2$, which projects inwardly toward and is contiguous to a conical surface $k^2$, formed upon the driving-pulley K. Said pulley is provided with suitable clutch mechanism, whereby its longitudinal outward movement may cause it to become disconnected from the driving-shaft $k$. Such clutch construction may be one of any well-known form—such, for instance, as shown in section in Fig. XIV. As the particular type of clutch mechanism used is not essential to the invention, it will be readily understood that any preferred form of such mechanism may be employed. In the event that a wad does not become normally seated in the wad-carrier the subsequent movement of the carrier effects the engagement of such misplaced wad with the lever L. Such engagement effects the oscillation of the lever L', which engages the conical surface $k^2$ and disconnects the driving-shaft, whereupon the operation of the device ceases.

As heretofore pointed out the machine described herein is adapted for use in connection with the sorting of wads formed of compressible or non-compressible material, such as felt or paper, respectively. In the former case the plungers in addition to positioning the lever $e^2$ compresses the wad with substantially the same pressure as would be used in the filling and crimping operations, so that the wad when sorted is of the proper thickness, this compressing taking place prior to the sorting of the wads. It will be readily understood that the wad is held in such compressed condition until the plunger is released, when it is positively ejected by the ejector-plungers, thus preventing any liability of the wads being misplaced by adhering to the face of the compressing-chamber, (the wad-recess,) such as might occur were dependence placed simply on the dropping of the wad by gravity.

Other modes of applying the principle of my invention may be employed instead of the one explained, change being made as regards the means herein disclosed, provided the means stated by any one of the following claims or the equivalent of such stated means be employed.

I therefore particularly point out and distinctly claim as my invention—

1. In a wad-sorting device, the combination of a wad-carrier; independent channels for wads of different thicknesses; means for compressing the wads in said carrier; means for retaining the compressors in position against the wads during a limited movement of the carrier; and means for ejecting the wads from the carrier upon the release of the compressors, the time when such release is effected being determined by the thickness of the wads.

2. In a wad-sorting device, the combination of a wad-carrier; independent channels for wads of different thicknesses; means for compressing the wads in said carrier; means for retaining such compressors in position against the wads during a limited movement of the carrier; and means for ejecting the wads from the carrier upon the release of the compressing means, such ejecting means being inoperative after the wad has been compressed and until the release of the compressors, the time when such release is effected being determined by the thickness of the wads.

3. In a wad-sorting device, the combination of a wad-carrier; independent channels for wads of different thicknesses; means for compressing the wad in said carrier; means for retaining such compressors in position against the wads during a limited movement of the carrier; and means operating at right angles to the compressors, for ejecting the wads from the carrier upon the release of the compressors, the period when such release is effected being determined by the thickness of the wads.

4. In a wad-sorting device, the combination of a wad-carrier; independent channels for wads of different thicknesses; means for compressing the wads in said carrier; means for retaining such compressors in position against the wads during a limited movement of the carrier; and means operating at right angles to said compressors, for ejecting the wads from the carrier upon the release of the compressors, said ejecting means being inoperative after the wad has been compressed until the release of the compressors, the time when such release is effected being determined by the thickness of the wads.

5. In a wad-sorting device, the combination of a wad-carrier, reciprocating means for compressing wads at intervals upon such carrier, means for actuating said compressing means to release the wads at various points in the carrier travel, and ejecting means held inoperative by said compressing means and rendered operative on the release actuation of said compressing means.

6. In a wad-sorting device, the combination of a rotary wad-carrier, a series of channels located at various points in the travel of such carrier, a series of reciprocating devices for compressing the wads on said carrier, means for adjusting said reciprocating devices according to the wad thickness and means for controlling said reciprocating devices to release the wads at various points in the carrier travel, such points varying as the wad thickness, and means operative by the release of such reciprocating devices for ejecting wads at such points.

7. In a wad-sorting device, the combination of a rotary wad-carrier having a series of peripheral recesses adapted to hold wads, a pressure device operative in each such recess, means for operating each such device, and a series of means operative throughout parts of the carrier travel and of varying lengths adapted to hold said pressure devices, whereby the latter may be caused to release the wads at various points in such travel.

8. In a wad-sorting device, the combination of a rotary wad-carrier having a series of peripheral recesses adapted to hold wads, a pressure device operative in each such recess, means for operating each such device, a series of means operative throughout parts of the carrier travel and of varying lengths adapted to hold said pressure devices, whereby the latter may be caused to release the wads at various points in such travel, and a series of ejecting devices controlled by said holding devices so as to operate on the release of the latter.

9. In a wad-sorting device, the combination of a rotary carrier provided with a series of wad-holding devices each operatively connected with a pivoted arm, a stationary hub provided with a series of holding-lugs of various lengths, and means for actuating said devices so as to throw said arms into engagement with one of such lugs.

10. In a wad-sorting device, the combination of a rotary carrier provided with a series of wad-holding devices operatively connected with a pivoted arm, of a stationary hub provided with a series of holding-lugs of various lengths, a presser-roller located in the path of said holding devices and adapted to actuate the latter to throw said arms into engagement with said lugs.

11. In a wad-sorting device, the combination of a rotary wad-carrier having a series of peripheral recesses for holding wads; independent channels for wads of different thicknesses; means for feeding wads into said recesses at a fixed point in the carrier's rotation; means for retaining the wads in said recesses during a limited movement of the carrier; ejectors adapted to discharge the wads from said recesses; and means for actuating said ejectors to discharge the wads at different points in the path of travel thereof, the particular point of discharge for any wad being determined by the thickness of such wad.

12. In a wad-sorting device, the combination of a rotary wad-carrier having a series of recesses for holding wads, a series of plungers, one such plunger being mounted upon said carrier adjacent to each recess and adapted to be projected therein, means located in the path of said plungers for actuating same inwardly, means for securing same in such inwardly-actuated position, the distance of such actuation being determined by the wad thickness.

13. In a wad-sorting device, the combination of a rotary wad-carrier having a series of recesses for holding wads; means adapted to retain the wads in said recesses under compression, the operation of such means being regulated by the wad thickness; means for applying, and means tending to remove, such retaining means; and a series of ejectors adapted to discharge the wads from said recesses upon the removal of such retaining means.

14. In a wad-sorting device, the combination of a rotary wad-carrier having a series of recesses for holding wads, each recess having a spring-actuated plunger mounted contiguously to it and capable of projection into such recess, an ejector having a direction of movement transverse with respect to the plunger movement, mounted contiguously to each such recess and capable of projection therein, means for actuating each said plunger and means for reciprocating said ejectors.

Signed by me this 3d day of December, 1900.

WILLIAM L. MORRIS.

Attest:
D. T. DAVIES,
A. E. MERKEL.